Patented Apr. 9, 1946

2,398,108

UNITED STATES PATENT OFFICE 2,398,108

METAL COATING

Elmer S. Mott, Akron, Ohio, assignor to Wingfoot Corporation, Akron, Ohio, a corporation of Delaware No Drawing. Application September 25, 1943, Serial No. 503,845

5 Claims. (Cl. 117—71)

This invention relates to bonding sprayed metal to a surface of metal, wood, plastic, etc., by an adhesive, and the invention includes the process of manufacture as well as the product.

According to this invention, a metal or other surface is coated with a cement which comprises 2-chlorobutadiene-1,3, a formaldehyde condensation product, and carbon black. The coated surface is then sprayed with metal, and the product is then baked, usually under pressure, to cure the cement. The bond between the sprayed metal and the metal base formed by the adhesive described herein is exceedingly strong, and there is no danger of the sprayed metal being removed from the metal base.

The base material may be aluminum, magnesium, iron, nickel or their alloys or may be tinplated copper or its alloys, etc., or other metal or may be wood, thermosetting plastic, etc.; and the metal which is sprayed may be aluminum, zinc, tin, iron or steel or, in fact, any metal which lends itself to conventional methods of metal spraying.

The invention has many applications as, for example, in building up an imperfectly cast metal form, in particular for filling in depressions on a relatively flat surface or for adding metal to a rod or shaft to increase its diameter. Another useful application is that of applying and securely bonding a metal coating for purposes of resisting wear, protection from corrosion, etc., or for purposes of ornamentation or appearance.

The adhesive may be compounded according to the following formula which involves first preparing Composition A and then using this to prepare the final adhesive:

Composition A

| | |
|---|---|
| Neoprene GN | 100.0 |
| Latac | 0.6 |
| Zinc oxide | 10.0 |
| Gas black | 50.0 |
| Light calcined magnesia | 10.0 |
| Agerite powder | 2.0 |
| Stearic acid | 0.5 |

The figures refer to parts by weight. Neoprene is polymerized 2-chlorobutadiene-1,3, Latac is hexamethylene ammonium hexamethylene dithiocarbamate, and Agerite powder is phenyl beta naphthylamine. Composition A is dissolved with a resin to form the final adhesive cement as follows, the figures representing parts by weight:

| | |
|---|---|
| Methylethyl ketone | 56 |
| Monochloro benzene | 24 |
| Bakelite resin XR10312 | 7 |
| Composition A | 20 |

Of course, in preparing the cement, the order in which the ingredients are added to the solvent may be varied, the Bakelite resin or other heat-polymerizable resin, such as urea formaldehyde or melamine formaldehyde, being added to the composition before forming the cement, if desired.

The following example illustrates the invention:

An aluminum casting in which there is a low spot is built up according to this invention by first covering the low spot with a very thin coat of a cement, such as that above described, and then spraying aluminum onto the coated surface. After the surface of the casting is built up to the desired height by spraying metal onto it, the cement is cured by heating, for example, at a temperature of 325° F. for about 15 minutes while applying a pressure in the neighborhood of 500 pounds per square inch. Then, the casting is finished off. The bond between the sprayed metal and the casting will be very strong.

In this way, one metal may be coated with another metal. For example, aluminum, after being coated with the adhesive, may be sprayed with zinc or other metal. Conversely, zinc, after being treated with the adhesive, may be sprayed with aluminum. The process has many applications and may replace electroplating as, for example, in producing a coating of one metal on a base of another metal as, for example, in the manufacture of automobile bumpers and hardware parts, etc.

What I claim is:

1. A base and a sprayed metal bonded thereto by an adhesive comprising 2-chlorobutadiene-1,3, a heat-hardened formaldehyde resin, and carbon black.

2. A metal base and a sprayed metal bonded thereto by an adhesive comprising 2-chlorobutadiene-1,3, a heat-hardened formaldehyde resin, and carbon black.

3. The method of spraying metal onto the surface of a base material which comprises first coating the surface with an adhesive of 2-chlorobutadiene-1,3, a heat-hardenable formaldehyde resin, and carbon black, spraying the metal onto the coated surface, and then curing the coating composition by heating under pressure.

4. The method of spraying metal onto a metal surface which comprises first coating the surface with an adhesive of 2-chlorobutadiene-1,3, a heat-hardenable formaldehyde resin, and carbon black, spraying the metal onto the coated surface, and then curing the coating composition by heating under pressure.

5. The method of spraying metal onto the surface of a base material which comprises first coating the surface with an adhesive comprising 20 parts of a composition comprising 100 parts of 2-chlorobutadiene-1,3, 50 parts of carbon black, 10 parts of zinc oxide, 10 parts of calcined magnesia, 0.6 part of hexamethylene ammonium hexamethylene dithiocarbamate and 7 parts of a composition containing primarily a phenolformaldehyde condensation product in a solvent comprising a mixture of methylethyl ketone and monochlorobenzene, spraying a film of metal onto the coated surface, coating the metal film with said adhesive, spraying a metal film onto the second adhesive coating, and then curing the coated base by heating under a pressure of about 500 pounds per square inch at a temperature of 325° F. for about 15 minutes.

ELMER S. MOTT.